United States Patent [19]

Kawai et al.

[11] Patent Number: 4,825,051
[45] Date of Patent: Apr. 25, 1989

[54] METHOD OF PROCESSING THE DATA IN BANKING TERMINAL

[75] Inventors: Rie Kawai, Nagoya; Kanzen Goto, Owariasahi; Kunio Morimoto, Seto, all of Japan

[73] Assignee: Hitachi, Ltd., Tokyo, Japan

[21] Appl. No.: 918,917

[22] Filed: Oct. 15, 1986

[30] Foreign Application Priority Data

Oct. 15, 1985 [JP] Japan .................................. 60-227702

[51] Int. Cl.⁴ .............................................. G06F 15/30
[52] U.S. Cl. .................................... 235/379; 364/408; 209/534
[58] Field of Search ........................ 209/534; 364/408; 235/379

[56] References Cited

U.S. PATENT DOCUMENTS

| | | | |
|---|---|---|---|
| 4,365,700 | 12/1982 | Arimoto et al. | 235/379 |
| 4,629,382 | 12/1986 | Ueshin | 209/534 |
| 4,694,963 | 9/1987 | Takesako | 235/379 |

*Primary Examiner*—Allen Macdonald
*Attorney, Agent, or Firm*—Antonelli, Terry & Wands

[57] ABSTRACT

The present invention provides a method of processing data transactions in a banking terminal which permits to effect an appropriate cash handling of received money and disbursement of money due as change even in the case when data which is indicative of the types of denominations of the received money is inputted after data indicative of an actual amount of a transaction is inputted, and also even when data which is indicative of the types and denominations of the received money or sorts of money is inputted before data indicating an actual amount of the transaction involved is inputted.

18 Claims, 4 Drawing Sheets

METHOD OF PROCESSING THE DATA IN BANKING TERMINAL

BACKGROUND OF THE INVENTION (a) Field of the Invention

The present invention relates to a method of processing the data in a banking teminal, and more particularly, to a method of processing the data, which data is optimally usable in inputting the sorts of cash paid in and the disbursing of change at the bank.

(b) Related-art Statement

One example of a known prior-art of processing data at banking terminals, is disclosed, for example, in the Unexamined Patent Publication (Kokai) No. 58-27261. The banking terminal disclosed in that Publication consists of a counter which selectively counts the received money including bills and coins according to the sorts of money and a machine for money receipts and disbursements which registers the monetary transaction are electrically connected to each other for effectively manipulating the servicing of money receipts and disbursements at the bank.

However, the banking terminals such that described above are of a total-first cash handling system type in which an actual total of the transaction is first displayed on the transaction display area in the CRT screen and then the sortings of the received money including, for example, two 1000-dollar bills, one 50-dollar bill, etc. are displayed.

Up to the present time, prior-art banking terminals of sort-first cash handling system have not yet been proposed in which, before an actual total of the transaction is displayed on the transaction display area in the CRT screen, the types of the money received are displayed on the money-sorting area, and then the total amount of money received is displayed on the transaction display area.

Recently, however, there has been a demand for development of a banking terminal which can effect both the above-mentioned total-first and sort-first cash handlings, thereby improving the operability of the banking terminal.

SUMMARY OF THE INVENTION

The present invention seeks to provide a method of processing the data in a banking terminal which permits the processing of money receipts and disbursements (including the change disbursement) using the total-first and sort-first systems.

According to another aspect of the present invention, a method of processing the data in a banking terminal is provided by which either the total-first or sort-first cash handling operation is effected with reference to a cash handling method setting area of a memory of a banking terminal in which the selected one of the total-first and sort-first cash handling systems is is set for handling money received and to an inputted money sort setting area which indicates whether or not the types of money received are displayed on the money-sorting area.

According to a yet another aspect of the present invention, á method of processing data in a banking terminal is provided by which, in the case where data indicative of a cash transaction amount is inputted before data is received which is representative of the types of money involved, the received money is handled with the cash handling method setting area set for the total-first cash handling.

According to a still another aspect of the present invention, a method of processing the data in a banking terminal is provided by which, in the case where data indicative of a cash transaction amount is inputted after data is received which is representative of the types of money involved, the received money is handled with the cash handling method setting area set for the sort-first cash handling.

According to a still yet another aspect of the present invention, a method of processing the data in a banking terminal is provided by which, when data indicative of the types of money is inputted, the money received is handled with the inputted money sort setting area set as "already inputted".

According to a further aspect of the present invention, a method of processing the data in a banking terminal is provided by which, using the sort-first cash handling method, all the sort data indicative of the amount of money received displayed on the money-sorting area are summed for display on the transaction display area, and the actual amount of the transaction is subtracted from the above sum to calculate the balance or change due for display on the money-sorting area.

According to a still further aspect of the present invention, a method of processing the data in a banking terminal is provided by which, using the sort-first cash handling method, a balance is calculated between a sum of money corresponding to sort data indicative of the amount of money received which is displayed on the money-sorting area and a sum of money sort data indicative corresponding to the an amount of change due which is displayed in the money-sorting area, and change data can be inputted so that the balance data indicates a zero or null.

These and other objects and disadvantages of the present invention will be better understood from the ensuing description made by way of example of the embodiment of the present invention with reference to the drawings:

DETAILED DESCRIPTION OF THE PREFERRED EMBODIMENTS

Figure 1:
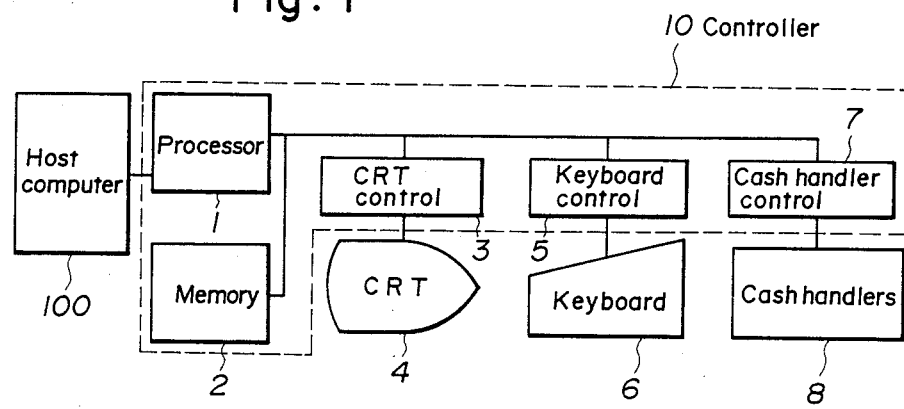
FIG. 1 is a block diagram of a banking terminal embodied according to the present invention.

FIG. 1 shows a block diagram of a banking terminal to which the present invention is applicable. As seen from this FIG. 1, the inventive apparatus comprises a controller 10 connected to a host computer 100. The controller 10 has a processor 1 which controls a CRT control 3, keyboard control 5 and a cash handler control 7 in accordance with a program stored in a memory 2. There is provided a keyboard 6 which is to be operated by an operator for inputting a transaction. The transaction inputted is supplied through the keyboard control 5 to the CRT control 3 for display on the screen of a CRT unit 4 under the control of the CRT control 3. There are also displayed on the screen of the CRT unit 4 prompts for the operator in operating the keyboard 6 and transaction results in addition to various information inputted from the keyboard 6. Also there are cash handlers 8 which count bills and coins inserted therein, and disburse changes or so under the control of the cash handler control 7.

The controller 10 has a memory 2 in which there is provided a cash handling method setting area and an inputted money sort setting area. In the cash handling method setting area, the received money which is to be handled by either the total-first or sort-first mode is set. For example, when the received money is handled in the total-first mode, $(01)_{16}$ is set in the cash handling method setting area; when it is to be done in the sort-first manner $(02)_{16}$ is set in the area. In the case where the cash handling manner is not yet selected one of the total-first or sort-first mode, which condition is interpreted as "unknown" and $(00)_{16}$ is set in the area.

In the inputted money sort setting area, it is set whether or not data as to types of money (such as one 100-dollar bill, two 100-dollar bills, etc.) has been inputted from the keyboard 6 and displayed on the money-sorting area. For example, when money sort data is not yet displayed, $(00)_{16}$ is set in the inputted money sort setting area; when money sort data is displayed, $(01)_{16}$ is set in the inputted money sort setting area.

Figure 2:
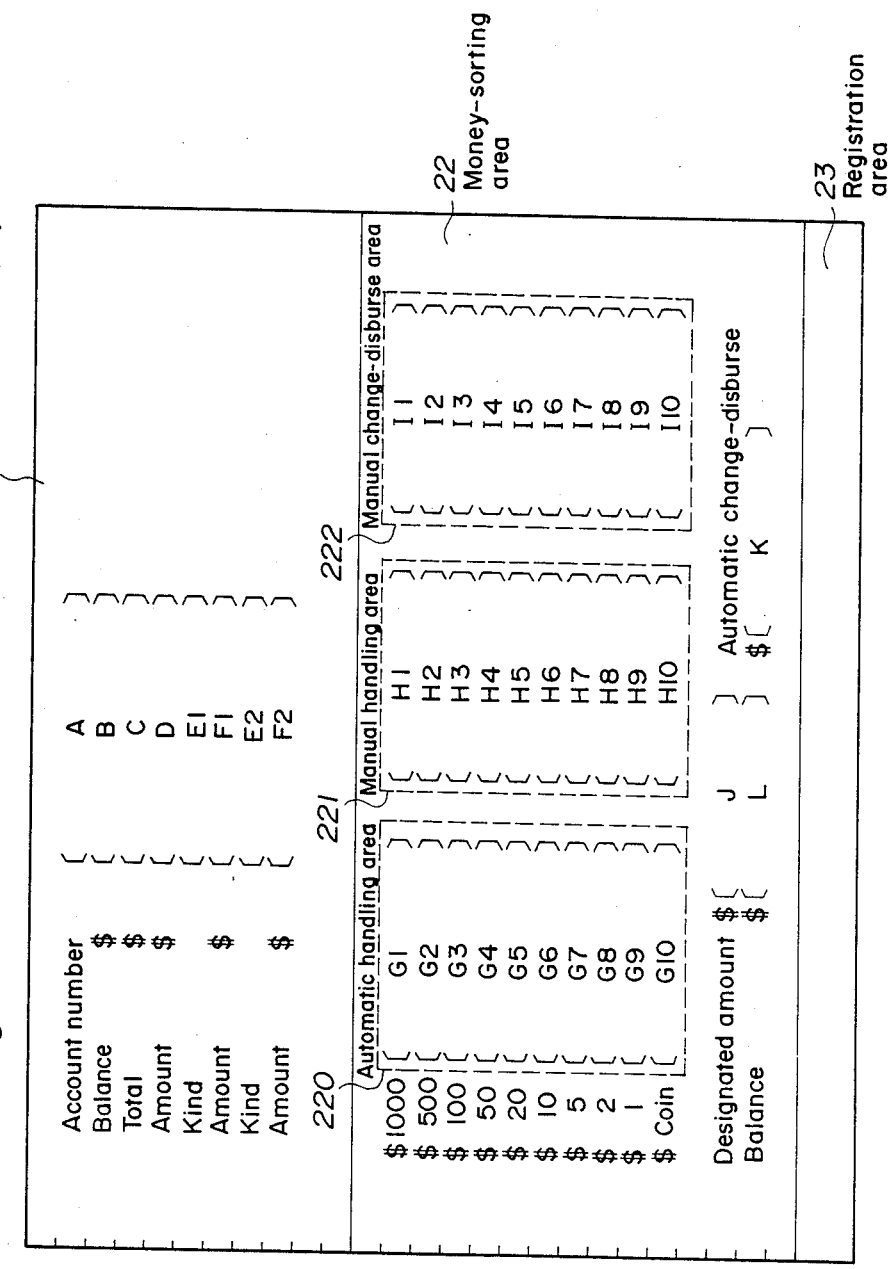
FIG. 2 shows one example of the display when cash handling is done in the embodiment shown in FIG. 1.

FIG. 2 shows one example of the display on the screen of CRT unit 4 of the banking terminal. The display shown in FIG. 2 shows an example of money reception (including change disbursement) and it consists of a transaction display area 21, money-sorting area 22 and a registration area 23.

The transaction display area 21 consists, as shown, of an account number area A, balance area B in which a balance of the account number is indicated, total area C in which an amount of a transaction by cash and checks is indicated, amount area D in which the received amount of cash is indicated, amount areas F1 and F2 in which received amounts by checks are indicated, and kind areas E1 and E2 in which the kinds of the checks are indicated. Note that only the total area C and amount area D are referred to in the explanation of the embodiment in consideration and the other areas have nothing to do directly with this embodiment.

As shown in FIG. 2, the money-sorting area 22 consists of an automatic handling area 220, manual handling area 221 and a manual change-disburse area 222. The automatic handling area 220 further consists of bill areas G1 to G9 for a range of money 1000 dollars to 1 dollar and a coin area G10. Namely, this automatic handling area 20 indicates a received amount of money according to each sort of money in each of the bill and coin areas when bills and coins are automatically received from any cash handlers 8 shown in FIG. 1.

The manual handling area 221 consists of bill areas H1 to H9 for a range of money 1000 dollars and 1 dollar and a coin area H10. This manual handling area 221 indicates a received amount of money according to each sort of money when the bank clerk handles a money received directly from a customer.

The manual change disburse area 222 consists of bill areas I1 to I9 for a range of money 1000 dollars to 1 dollar and a coin area I10. That is, this change-disburse area 222 indicates by each sort of money a balance calculated in the change disbursement between a received amount of money and an amount of a transaction.

In addition, the money-sorting area 22 has a designated amount area J, automatic change disburse area K and a balance area L. The designated amount area J is provided to temporarily indicate the indicated value in the amount area D on the transaction display area 21. The automatic change disburse area K indicates the amount of a change to automatically be paid to the customer at the cash handlers 8 shown in FIG. 1. The balance area L indicates a balance between a received amount of money and an amount of transaction in the change disbursement.

The registration area 23 is provided to temporarily indicate the amounts of money when they are indicated in the amount area D and bill areas H1, H2, etc. on the money-sorting area 22.

Figure 3:
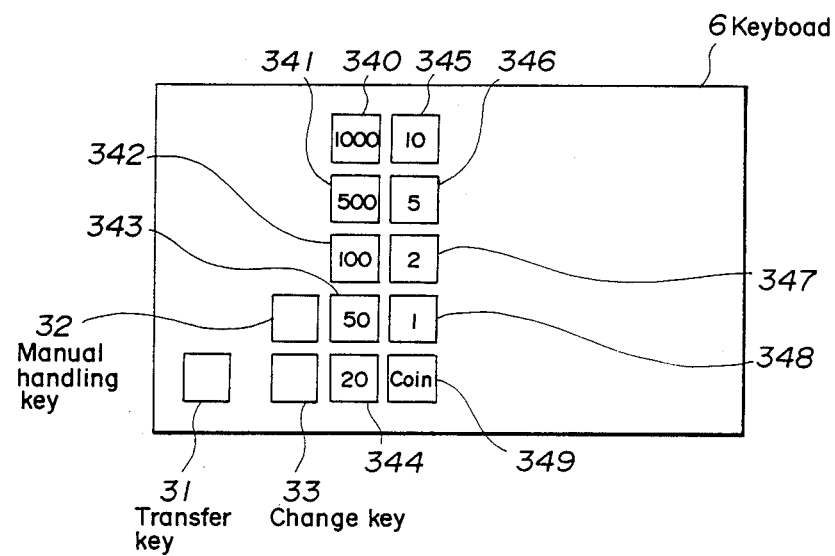
FIG. 3 is one example of the keyboard in the embodiment shown in FIG. 1.

An amount of money is indicated in the total area C and amount area D on the transaction display area 21 as will be described below. First, a predetermined value is inputted from the keyboard 6 and displayed in the registration area 23. Then the cursor (not shown) is positioned in, for example, the amount area D and the transfer key 31 shown in FIG. 3 is pressed. Thus, the value in the registration area 23 is indicated in the amount area D in which the cursor is positioned. For indicating an amount of money in the bill areas H1, H2, etc. on the money-sorting area 22, the following procedure is done. First, a predetermined value is inputted from the keyboard 6 and indicated in the registration area 23. In case an amount of money is to indicated in the bill areas H1 to H9 and coin area H10 on the manual handling area 221, the manual handling key 32 shown in FIG. 3 is pressed and any one of the money-sorting keys 340 to 349 for the respective money sorts such as 1000 dollars, 500 dollars is pressed. Thus, the value in the registration area 23 is indicated in a predetermined area within the manual handling area 221. Similarly, in case an amount of money is to be indicated in the bill areas I1 to I9 and coin area I10 in the manual change disburse area 222, the change key 33 is pressed, and any one of the money sorting keys 340 to 349 is pressed, whereby the value in the registration area 23 will be indicated in a predetemined area within the change disburse area 222.

Figure 4:
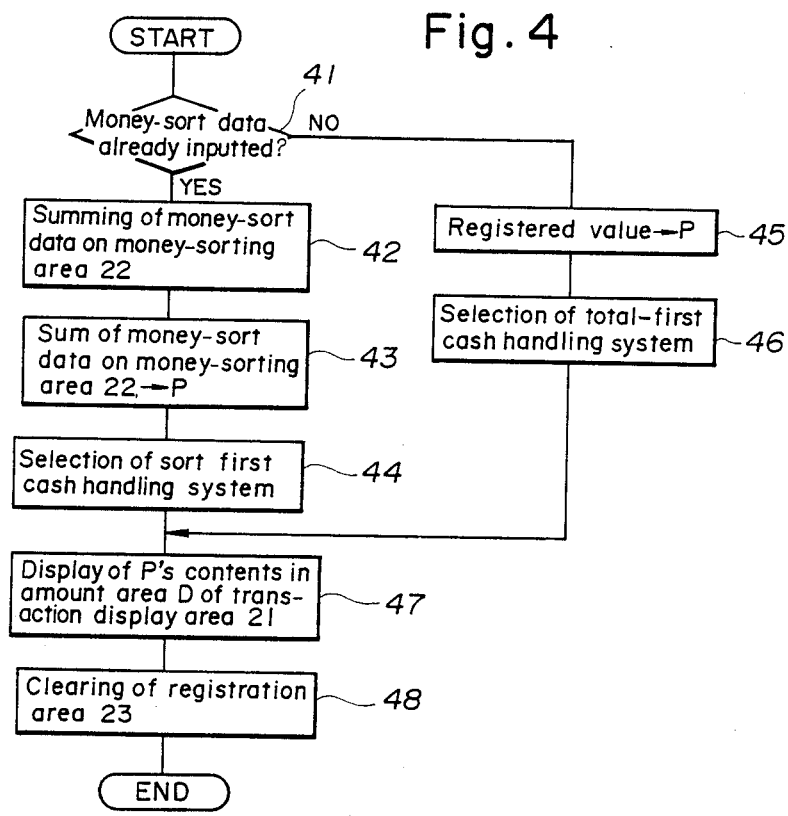
FIGS. 4 and 5 are flow charts, respectively, showing the flows of operations in the embodiment shown in FIG. 1.
Figure 5:
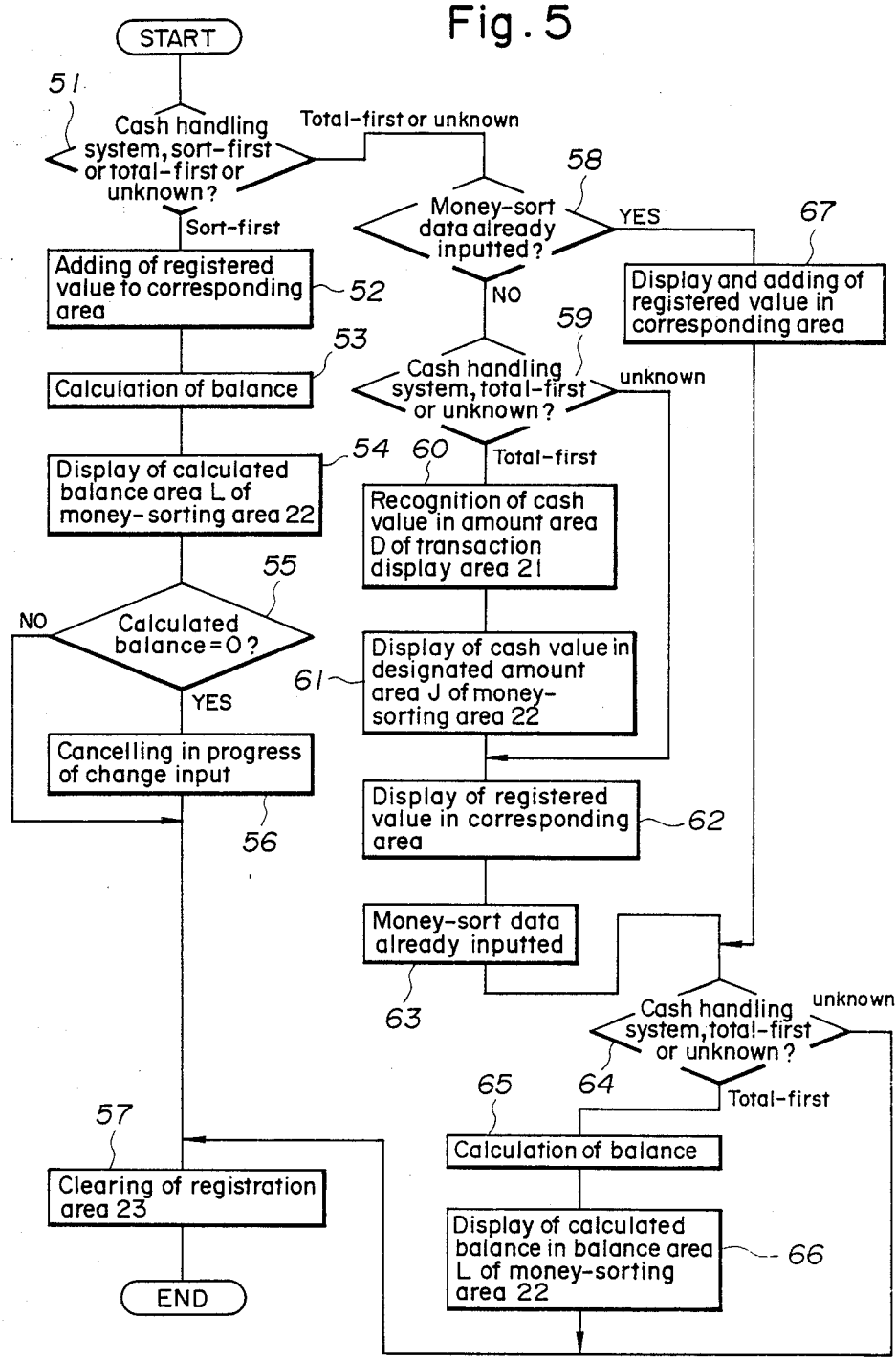

Next, the operation of the banking terminal shown in FIG. 1 will be explained with reference to the flow charts in FIGS. 4 and 5. The operations in the flow chart shown in FIG. 4 are executed by pressing the transfer key 31 on the keyboard 6 to indicate the value in the registration area 23 into the amount area D on the transaction display area 21. The operations in the flow chart shown in FIG. 5 are done by pressing any one of the money sorting keys 340 to 349 to indicate an amount of money in each of the bill areas H1 to H9, I1 to I9 and coin areas H10 and I10 on the money-sorting area 22, and in the automatic change disburse area K. In accordance with a simple illustration and description, in an example in which an actual transaction of 950 dollars takes place, the customer passes a 1000-dollar bill to the operator who will manually handle the received money (any of the cash handlers 8 is not to be used) will be explained below.

First, the total-first cash handling operation will be described, this case, an operation to indicate the actual amount of transaction "950" dollars in the amount area D on the transaction display area 21 is first effected. For this purpose, the operator uses the keyboard 6 to input "950" into the registration area 23, and thereafter he presses the transfer key 31. Thus, the operations in the flow chart shown in FIG. 4 will be started. First at the step 41, a determination is made as to whether or not money sort data has been inputted. This determination is made by referring to the inputted money sort setting area in the memory 2. In this case, since no money-sort data is inputted, the determination is "NO". Next, the operation goes to the step 45 where the registered value "950" indicated in the registration area 23 is stored in a predetermined area P in the memory 2. Further, the operation goes to the step 46 where the cash handling method setting area in the memory 2 is set for the total-first cash handling. At the step 47, the value "950" stored in the area P of the memory 2 is read and displayed in the amount area D on the transaction display area 21. At the step 48, the registration area 23 is cleared.

In the following discussion, the operations for display of the types of money received from a customer on the money-sorting area 22 will be explained. Since the money received from the customer is a 1000-dollar bill in this embodiment, as described above, first "1000" is indicated as a registered value in the registration area 23. In order to indicate "1000" in the bill area H1 in the manual handling area 221, the manual handling key 32 is pressed and then the money sorting key 340 is pressed, whereby the operations shown in FIG. 5 are started. First, at the step 51, a determination is made as to whether the cash handling is according to the total-first, sort-first or unknown. This determination in reference to the cash handling method setting area in the memory 2. In this case, since the total-first cash handling has been set up at the step 46 in FIG. 4, the operation goes to the step 58 where a money sort data is inputted and a determination is made as to whether it is displayed on the money-sorting area 22 of the CRT screen. This determination is made by referring to the inputted money sort setting area in the memory 2. In this case, since no money sort data has been indicated on the money-sorting area 22, the determination will be "NO". At the next step 59, a determination is made as to whether the cash handling is according to the total-first type or is an unknown. The "unknown" referred to herein means that the cash handling method setting area has been set for neither the total-first nor the sort-first. In this case, since that area has already been set for the total-first, the operation goes to the step 60 where the value indicated in the amount area D on the transaction display area 21 is recognized. At the step 61, the value in the amount area D that has been recognized is indicated in the designated amount area J on the money-sorting area 22. In this case, "950" is indicated in the area J. At the next step 62, the value indicated in the registration area 23 is indicated in one of the areas H1 to H10 in the manual handling area 221 on the money-sorting area 22 and that has been designated by pressing a corresponding one of the keys on the keyboard. In this particular case, "1000" is indicated in the bill area H1. At the step 63, the inputted money sort setting area is set as "money-sort data already inputted". At the next step 64, it is determined whether the cash handling is the total-first or unknown. In this case, since the cash handling has already been set for the total-first, the operation goes to the step 65 where the balance between value indicated in the designated amount area J and the value indicated in the bill areas H1 to H9 and coin area H10 is calculated. At the next step 66, the calculated balance is indicated in the balance area L on the money-sorting area 22. In this particular case, "950" is indicated in the designated amount area J, and "1000" is indicated in the bill area H1. Therefore, "50" is indicated in the balance area L. Next, at the step 57, the registered value in the registration area 23 is cleared and the operations are over here.

In the case money containing more than one type of bill denominations and coins is received, money sort data must be indicated in the corresponding ones of the bill areas H1 to H9 and coin area H10. In this case, when the operation for indicating a first one of the above-mentioned money sort data is completed, the inputted money sort data setting area is set as "money-sort data already inputted" at the step 63. Thus, the second and subsequent indications of money sort data area made at the step 67 since the judgement is "YES" at the step 58. At the step 67, the registered value indicated in the registration area 23 is indicated in one of the bill areas H1 to H9 and coin area H10 that has been designated by operating the keyboard 6. It should be noted that in the case where a value is already indicated in one of the bill areas H1 to H9 and coin area H10, a value of that value plus the above-mentioned registered value is newly indicated in one of the bill areas H1 to H9 and coin area H10. The subsequent operations at the steps 64 to 66 and 57 are similar to the operations for inputting the above-mentioned initial money sort data.

Next, the change disbursement in the case when a balance is indicated in the balance area L after all the money sort data are inputted will be explained. In the particular case described above, "50" was indicated in the balance area L. In this case, the value indicated in the balance area L is first indicated in the registration area 23 by operating the keyboard 6. Next, the change key 33 shown in FIG. 3 is pressed and then any one of the money sorting keys 340 to 349 is pressed. In the above-mentioned particular case, "50" is indicated in the registration area 23, and the money sorting key 343 for the 50-dollar bill is pressed, thereby starting the operations in the flow chart shown in FIG. 5 again.

In this case, similar to the operation for inputting money sort data of more than one sort of money, the operation goes to the step 67 through the steps 51 and 58. At the step 67, the registered value indicated in the registration area 23 is indicated, as designated by operating the keyboard 6, in one of the bill areas I1 to I9 and coin area I10 in the manual change-disburse area 222. In the above-mentioned particular case, "50" is indicated in the bill area I4. At the next step 64, the cash handling is determined to be the total-first, and at the step 65, a balance calculation is done also with the value shown in the manual change-disburse area 222. In the above-mentioned particular case, the value "50" indicated in the bill area I4 is subtracted from the value "1000" indicated in the bill area H1. Further, the value "950" indicated in the designated amount area J is subtracted from the result "950" of the preceding subtraction, resulting in a result "0". At the step 65, the result of the above balance calculation is indicated in the balance area L, and the registration area 23 is cleared at the step 57. In the above particular case, "0" is indicated in the balance area L.

Note that generally in the above-mentioned change disbursement, the series of operations at the steps 51, 58, 67, 64 to 67 and 57 are repeated until the indication in the balance area L becomes "0".

In the above-mentioned embodiment, an amount of change is indicated in some of the bill areas I1 to I9 and coin area I10 in the manual change-disburse area 222. Watching this, the operator will manually disburse the change to the customer. However, by indicating the amount of change in the automatic change disburse area K, it is possible to automatically disburse the change using the cash handler.

As apparent from the foregoing explanation, the present invention provides a method of processing the data in a banking terminal, by which it is determined whether the cash handling is total-first or sort-first and an appropriate cash handling can be done even in case of the total-first cash handling.

Here, the sort-first cash handling system according to the present invention will be explained. With respect to the sort-first cash handling system, money sort data is first indicated in the money-sorting area 22. In the preceding case, "1000" is first indicated in the bill area H1 on the money-sorting area 22. The operations involved in this case will be explained with reference to the flow chart shown in FIG. 5 herebelow.

First, the operator uses the keyboard 6 to indicate "1000" in the registration area 23. Then, he presses the manual handling key 32 and money sorting key 340, whereby the operations in the flow chart shown in FIG. 5 are started. First at the step 51, it is determined whether or not the cash handling is according to the sort-first method. In this case, since the cash handling method setting area in the memory 2 is yet "unknown", the cash handling method is determined not to be of the sort-first type, the operation goes to the step 58 where it is determined whether or not any indication of money sort data is made in the money-sorting area 22. In this case, since no money sort data is yet indicated in the money-sorting area 22, the judgement will be "NO" and the operation goes to the step 59 where it is judged whether the cash handling is the total-first or unknown. Since the judgement is "unknown" in this case, the operation goes to the step 62 where money sort data indicated in the registration area 23 is indicated, as designated by operating the keyboard 6, in any of the areas H1 to H10. In the above particular case, "1000" is indicated in the bill area H1. Next, at the step 63, the inputted money sort setting area in the memory 2 is set for "money-sort data already inputted". At the next step 64, it is determined whether the cash handling is by the total-first method or is unknown. In this case, since the determination is "unknown", the operation goes to step 57 where the registration area 23 is cleared.

In the case when money containing more than one type of bill denominations and coins is received, the operator indicates money sort data in the registration area 23 again, and repeats the above-described operations in the money-sorting area 22. In this case, since the inputted money sort setting area has already been set as "money-sort data already inputted", the determination at the step 58 will by "YES". As a result, money sort data are indicated, as designated by operating the keyboard 6, the bill denomination and coin areas H1 to H10. The operations to be executed at the steps 64 and 57 are similar to those mentioned in the foregoing.

After all the money sort data are indicated in the manual handling area 221 of the money-sorting area 22, the operator effects the operations for summing the money sort data and indicating the total in the amount area D. The above-mentioned operations are started by pressing the transfer key 31. That is, when the transfer key 31 is pressed, the operations in the flow chart shown in FIG. 4 are started, and at the step 41, it is determined whether or not the inputted money sort setting area has been set as "money-sort data already inputted". In this case, since that area has alredy been set "money-sort data already inputted", the determination outcome at the step 41 will be "YES". At the step 42, the money sort data indicated in the money-sorting area 22 are summed. Next, at the step 43, the sum thus calculated is stored into the area P within the memory 2. At the next step 44, the cash handling method setting area is set as the sort-first. Then at the step 47, the value stored in the area P within the memory 2 is read out and indicated in the amount area D within the transaction display area 21. In the above particular case, "1000" is indicated in the amount area D. At the step 48, the registration area 23 is cleared. In this case, however, since no value is indicated in the registration area 23, the operations at the step 48 may be omitted.

Next, the operator uses the keyboard 6 to indicate an actual amount of transaction in the total area C. In the above particular case, "950" will be indicated in the total area C.

Next, the change disbursement will be described below. The operator first presses the change key 33, whereby the values in the amount area D and amount areas F1 and F2 are added together and the value in the total area C is subtracted from the result of this addition. The amount areas F1 and F2 are provided to indicate any amount of money when a money by a check is received. The result of the above subtraction indicates the amount of change. Next, this amount of change is subtracted from the value in the amount area D and the result is newly indicated in the amount area D. In the above particular case, the value in the amount area D will be changed from "1000" to "950". Next, operations for indicating the value in the amount area D into the designated amount area J on the money-sorting area 22 will be done. In the above particular case, "950" will be indicated in the designated amount area J. Then, operations for indication of the above amount of change into the balance area L on the money-sorting area 22 are done. In the above particular case, "50" will be indicated in the balance area L.

The above-mentioned series of operations is executed by pressing the above-mentioned change key 33. When the above operations are completed, "change input in progress" will be set in a predetemined area in the memory 2.

Next, the operator will do the operations for the change disbursement which will be described below. Namely, the operator effects the operations for indicating the value indicated in the balance area L into the registration area 23 and also the value into an appropriate one of the areas I1 to I10 on the money-sorting area 22. In the above particular case, "50" is indicated in the registration area 23 and then "50" is in the bill area I4. In this case, the operations in the chart shown in FIG. 5 are repeated again. Namely, at the step 51, the cash handling method is determined to be of the sort-first type, and the operation goes to step 52 where the value indicated in the registration area 23 is indicated, as designated by operating the keyboard 6, into one of the bill denomination and coin areas I1 to I10 in the manual change disburse area 22. At the next step 53, a similar balance calculation to that at the step 65 is done. At step 54, a newly calculated balance is indicated in the balance area L in the money-sorting area 22. In the above particular case, the balance is "0" and the "0" is indicated in the balance area L. At the next step 55, it is determined whether or not the balance is "0". If the balance is not zero at step 55, the registration area 23 is cleared at the step 57 and the operations at the steps 51 to 55 are repeated by pressing any one of the money sorting keys 340 to 349. If the determination is "YES" at step 55, the "change input in progress" set in a predetemined area of the memory 2 is cancelled at step 56 and the registration area 23 is cleared at step 57.

In the above-mentioned embodiment, an amount of change is indicated in the manual change-disburse area 222, but also it is possible to indicate it in the automatic disburse area K and to automatically disburse the change at the cash handler 8.

As apparent from the foregoing illustration of the method of processing data in the banking terminal according to the present invention, a determination effected as to whether cash handling is by the total-first method or sort-first and to effect appropriate cash handling even when using a sort-first cash handling system.

What is claimed is:

1. A method of processing data in a banking terminal which comprises a display unit having a display surface including a transaction display area for indicating contents of a transaction at a bank, a money sorting area including a manual handling area for indicating sorts of money received from a customer, a manual change-disburse area for indicating sorts of money of change to be disbursed, a balance area and a designated amount area used in calculating the balance, and said display surface further including a registration area for indicating the data to be subsequently displayed on the transaction area and the money sorting area; a data input unit; a cash handler for automatically calculating the received bills and coins and for automatically disbursing change due; and a controller for the display unit, the data input unit and the cash handler, wherein said method comprising the steps of:

determining the priority between data input corresponding to the total money-amount of a transaction to be displayed on said transaction display area and data input corresponding to the sorts of received money to be displayed on said money sorting area;

summing the data corresponding to the sorts of received money which is displayed on said money-sorting area when it is determined that the data input corresponding to the sorts of money to be displayed on said money-sorting area has priority over the data input corresponding to the transaction total money-amount; and displaying the summation on said transaction display area and/or said designated amount area.

2. A method or processing data in a banking terminal according to claim 1, wherein said data input unit comprises a keyboard.

3. A method of processing data in a banking terminal according to claim 2, wherein said sorts of money includes bills, coins and denominations thereof.

4. A method of processing data in a banking terminal which comprises a display unit having a display surface including a transaction display area for indicating contents of a transaction at a bank, a money sorting area including a manual handling area having a plurality of sorting locations for indicating sorts of money received from a customer, a manual change-disburse area having a plurality of sorting locations for indicating sorts of money of change to be disbursed, a balance area and a designated amount area used in calculating the balance, and said display surface further including a registration area for indicating the data to be subsequently displayed on the transaction area and the money sorting area; a data input unit; a cash handler for automatically calculating the received bills and coins and for automatically disbursing change due; and a controller for the display unit, the data input unit and the cash handler, said controller including a memory for storing money sort data, wherein said method comprising:

storing money sort data in a location in the memory of said controller when data corresponding to the sorts of received money is inputted to one or more of said manual handling area sorting locations of said money sorting area;

determining the priority between data input corresponding the total money-amount of a transaction and data input corresponding to the sorts of received money based on data stored in said memory area;

summing the data corresponding to the sorts of received money which is displayed on said money sorting area when it is determined that the data input corresponding to the sorts of money to be displayed on the money sorting area has priority over the data input corresponding to the transaction total money-amount; and displaying the summation on said transaction display area and/or said designated amount area of the money sorting area.

5. A method or processing data in a banking terminal according to claim 4, wherein said data-input unit comprising a keyboard.

6. A method of processing data in a banking terminal according to claim 5, wherein said sorts of money includes bills, coins and denominations thereof.

7. A method of processing data in a banking terminal which comprises a display unit having a display surface including a transaction display area for indicating contents of a transaction at a bank, a money sorting area including a manual handling area having a plurality of sorting locations for indicating sorts of money received from a customer, a manual change-disburse area having a plurality of sorting locations for indicating sorts of money of change to be disbursed, a balance area and a designated amount area used in calculating the balance, and said display surface further including a registration area for indicating the data to be subsequently displayed on the transaction area and the money sorting area; a data input unit comprising a keyboard; a cash handler for automatically calculating the received bills and coins and for automatically disbursing change due; and a controller for the display unit, the data input unit and the cash handler, said method comprising:

first step of determining the priority between data input corresponding to the total money-amount of a transaction to be displayed on said transaction display area and data input corresponding to the sorts of received money to be displayed on said money sorting area;

second step of summing the data corresponding to the sorts of received money which is displayed on the money sorting area when it is determined that the data input corresponding to the sorts of money to be displayed on said money sorting area has priority over the data input corresponding to the transaction total money-amount;

third step of displaying the summation on a first area of said transaction display area;

fourth step of displaying the total money-amount of said transaction on a second area of the transaction display area;

fifth step of subtracting the amount displayed on said second area from the amount displayed on said first area and displaying an amount corresponding to the result of the subtraction on the balance area of said money sorting area;

sixth step of subtracting the amount displayed on the balance area from the amount displayed on said first area of the transaction area and displaying again an amount corresponding to the result of the subtraction on said first area;

seventh step of displaying the amount displayed on said first area on said designated amount area of the money sorting area;

eighth step of displaying a balance amount in corresponding locations of said manual change-disburse area of the money sorting area in accordance with the amount displayed on the balance area;

ninth step of summing the data corresponding to the amounts on the respective locations of said manual change-disburse area; and tenth step of subtracting the amount displayed on said manual change-disburse area from the summation of the amounts on the respective locations of said manual handling area, subtracting the amount displayed on the designated amount area from the subtraction result, and displaying the subtraction result on the balance area.

8. A method of processing data in a banking terminal according to claim 7, wherein said eighth, ninth and tenth steps are effected repeatedly in that order until the amount displayed on the balance area becomes zero.

9. A method of processing data in a banking terminal according to claim 7, wherein said sorts of money includes bills, coins and denominations thereof.

10. A method of processing data in a banking terminal which comprises a display unit having a display surface including a transaction display area for indicating contents of a transaction at a bank, a money sorting area including a manual handling area having a plurality of sorting locations for indicating sorts of money received from a customer, a manual change-disburse area having a plurality of sorting locations for indicating sorts of money of change to be disbursed, a balance area and a designated amount area used in calculating the balance, and said display surface further including a registration area for indicating the data to be subsequently displayed on the transaction area and the money sorting area; a data input unit comprising a keyboard; a cash handler for automatically calculating the received bills and coins and for automaticallly disbursing change due; and a controller for the display unit, the data input unit and the cash handler, said controller including a memory for storing money sort data, said method comprising:

first step of storing money sort data in a location in the memory of said controller when data corresponding to the sorts of received money is inputted to one or more of the manual handling area sorting locations of said money sorting area;

second step of determining the priority between data input corresponding to the total money-amount of a transaction and data input corresponding to the sorts of received money based on data stored in said memory;

third step of summing the data corresponding to the sorts of received money which is displayed on said money sorting area when it is determined that the data input corresponding to the sorts of money to be displayed on the money sorting area has priority over the data input corresponding to the transaction total money-amount;

fourth step of displaying the summation on a first area of the transaction display area;

fifth step of displaying the total money-amount of said transaction on a second area of said transaction display area;

sixth step of subtracting the amount displayed on the second area from the amount displayed on said first area and displaying an amount corresponding to the result of the subtraction on the balance area of the money sorting area;

seventh step of subtracting the amount displayed on the balance area from the amount displayed on the first area of said transaction display area and displaying again an amount corresponding to the result of the subtraction on said first area;

eighth step of displaying the amount displayed on said first area on the designated amount area of the money sorting area;

ninth step of displaying a balance amount in corresponding locations of said manual change-disburse area of said money sorting area in accordance with the amount displayed on the balance area;

tenth step of summing the data corresponding to the amounts on the respective locations of said manual change-disburse area; and eleventh step of subtracting the amount displayed on said manual change-disburse area from the summation of the amounts on the respective locations of said manual handling area, subtracting the amount displayed on the designated amount area from the subtraction result, and displaying the subtraction result on the balance area.

11. A method of processing data in a banking terminal according to claim 10, wherein said ninth, tenth and eleventh steps are effected repeatedly and in that order until the amount displayed on the balance area becomes zero.

12. A method of processing data in a banking terminal according to claim 10, wherein said sorts of money includes bills, coins and denominations thereof.

13. A method of processing data in a banking terminal which comprises a display unit having a display surface including a transaction display area for indicating contents of a transaction at a bank, a money sorting area including a manual handling area having a plurality of sorting locations for indicating sorts of money received from a customer, a manual change-disburse area having a plurality of sorting locations for indicating sorts of money of change to be disbursed, a balance area and a designated amount area used in calculating the balance, and said display surface further including a registration area for indicating the data to be subsequently displayed on the transaction area and the money sorting area; a data input unit including a keyboard; a cash handler for automatically calculating the received bills and coins and for automatically disbursing change due; and a controller for the display unit, the data input unit and the cash handler, wherein said method comprising:

first step of determining the priority between data input corresponding to an overall money-amount of a transaction to be displayed on said transaction display area and data input corresponding to the sorts of received money to be displayed on said money sorting area;

second step of summing the data corresponding to the sorts of received money being displayed on said money sorting area when it is determined that the data input corresponding to the sorts of money to be displayed on said money sorting area has priority over the data input corresponding to the overall transaction money amount;

third step of displaying the summation on a first area of the transaction display area;

fourth step of displaying the overall money amount of said transaction on a second area of the transaction display area and displaying an amount by a check on a third area of the transaction display area;

fifth step of summing the amount displayed on the first area and the amount displayed on the third area of said transaction display area, subtracting the amount displayed on the first area from the amount of the summation, and displaying an amount corresponding to the subtraction result on the balance area of said money sorting area;

sixth step of subtracting the amount displayed on the balance area from the amount displayed on the first area of said transaction display area and displaying again an amount corresponding to the result of the subtraction on the first area;

seventh step of displaying the amount displayed on the first area on the designated amount area of said money sorting area;

eighth step of displaying a balance amount in corresponding locations of the manual change disburse area of said money sorting area in accordance with the amount displayed on the balance area;

ninth step of summing the data corresponding to the amounts in respective locations of the manual change-disburse area; and tenth step of subtracting the amount displayed on the manual change-disburse area from the summation of the amounts on the respective locations of the manual handling area, subtracting the amount displayed on the designated amount area from the subtraction result, and displaying the subtraction result on the balance area.

14. A method of processing data in a banking terminal according to claim 13, wherein said eighth, ninth and tenth steps are effected repeatedly and in that order until the amount displayed on the balance area becomes zero.

15. A method of processing data in a banking terminal according to claim 13, wherein said sorts of money includes bills, coins and denominations thereof.

16. A method of processing data in a banking terminal which comprises a display unit having a display surface including a transaction display area for indicating contents of a transaction at a bank, a money sorting area including a manual handling area having a plurality of sorting locations for indicating sorts of money received from a customer, a manual change-disburse area having a plurality of sorting locations for indicating sorts of money of change to be disbursed, a balance area and a designated amount area used in calculating the balance, and said display surface further including a registration area for indicating the data to be subsequently displayed on the transaction area and the money sorting area; a data input unit including a keyboard; a cash handler for automatically calculating the received bills and coins and for automatically disbursing change due; and a controller for the display unit, the data input unit and the cash handler, said controller including a memory for storing money sort data, wherein said method comprising:

first step of storing money sort data in a location in the memory of said controller when data corresponding to the sorts of received money is inputted to one or more of the manual handling area sorting locations of said money sorting area;

second step of determining the priority between data input corresponding to an overall money-amount of a transaction and data input corresponding to the sorts of received money in accordance with data stored in the memory;

third step of summing the data corresponding to the sorts of received money displayed on said money sorting area when it is determined that the data input corresponding to the sorts of money to be displayed on the money sorting area has priority over the data input corresponding to the overall transaction money-amount;

fourth step of displaying the summation on a first area of the transaction display area;

fifth step of displaying the overall money amount of said transaction on a second area of said transaction display area and displaying an amount by a check on a third area of said transaction display area;

sixth step of summing the amount displayed on the first area and the amount displayed on the third area of said transaction display area, subtracting the amount of displayed on the first area from the amount of the summation, and displaying an amount corresponding to the subtraction result on the balance area of said money sorting area;

seventh step of subtracting the amount displayed on the balance area from the amount displayed on the first area of said transaction display area and displaying again an amount corresponding to the subtraction result on the first area;

eight step of displaying the amount displayed on the first area on the designated amount area of the money sorting area;

ninth step of displaying a balance amount in corresponding locations of the manual change-disburse area of said money sorting area in accordance with the amount displayed on the balance area;

tenth step of summing the data corresponding to the amounts in respective locations of the manual change-disburse area; and eleventh step of subtracting the amount displayed on the manual change-disburse area from the summation of the amounts on the respective locations of the manual handling area, subtracting the amount displayed on the designated amount area from the subtraction result, and displaying the subtraction result on the balance area.

17. A method of processing data in a banking terminal according to claim 16, wherein said ninth, tenth and eleventh steps are effected repeatedly and in that order until the amount displayed on the balance area becomes zero.

18. A method of processing data in a banking terminal according to claim 16, wherein said sorts of money includes bills, coins and denominations thereof.

* * * * *